2,763,557

BLOCK FREEZING

Øyvind Helgerud, Nordstrandshogda, and Alf Olsen, Fagertun pr. Drammen, Norway, assignors to A/S Protan, Drammen, Norway No Drawing. Application December 6, 1952, Serial No. 324,596

Claims priority, application Norway December 11, 1951

6 Claims. (Cl. 99—192)

This invention relates to a novel method of preserving foodstuffs by block freezing.

In addition to the usual practice of hermetically sealing sterilized foods in containers, food is often preserved by deep freezing or block freezing. In simple deep freezing, the food is frozen and maintained at a low temperature, well below freezing, for extended periods of time, but such processing has the disadvantage that water contained in the food stuff will sublimate so that the contents dry out after an extended period. In the case of some foods such as fish, which contain much water, block freezing has been used. This method consists of placing the fish or other foodstuff in a container, filling the container with water, and subsequently freezing the same into an ice block. Although this method prevents dehydration of the food, it does have the disadvantage that the frozen food can only be removed after the ice has melted and the foodstuff is then thawed and soft. Thus, the entire block of food must be utilized at substantially the same time.

According to the present invention, the above mentioned drawbacks are avoided and it is possible to keep various foods at low temperatures for long periods of time, particularly foods such as fish, fish products, shell fish, meat and meat products. and all kinds of vegetables.

In accordance with the present invention, a solution is first prepared of alginate and a gelatinizing agent. The solution prepared in such a manner, as is hereinafter described in detail, after a certain period of setting, gelatinizes. The food product to be preserved may be packed in a suitable container, the solution added, and after gelatinization has taken place, the package deep frozen. In this manner, evaporation of water is avoided and flavor is not extracted from the foodstuff.

When such a package is thawed, the gel again attains its former consistency and the contents of the package can be removed in more or less frozen condition and have substantially the same flavor and appearance as before freezing.

The products of the present invention in deep frozen condition are hard, as is the case with the usual block freezing, and the frozen gel is infiltrated with ice crystals. In accordance with one embodiment of the present invention, the hardness of the frozen bulk can be decreased to the extent that the gel can be easily cut or divided while still frozen. This is accomplished by adding to the solution certain substances such as water soluble inorganic salts or organic compounds, or a mixture of both. Thus, by the addition of a salt such as ordinary sodium chloride, in about 10% concentration, the thawing of the gel takes place at a temperature well below the thawing temperature of the foodstuff. In this manner, it is possible to partially thaw the block so that the food can be separated while the food remains in a fully frozen condition.

Instead of salt, one can add an organic compound which is water soluble, such as glycerin, in a quantity of from 5% to 30%. In this manner, a frozen gel can be obtained which has such a consistency that it can be cut or divided from deep frozen foodstuffs without damaging the frozen food in any manner.

It will be evident from the above that the method of the present invention offers great advantages compared with the freezing methods now in use. Since the gel is not a liquid, all of the possible deleterious effects of contact with water are avoided and nothing of the nutrient value or flavor of the food diffuses into the gel.

The acidity or pH of the solution is chosen to correspond with that of the product being preserved. For instance, in preserving shrimp a pH of from 2.5 to 4 is used. Ordinarily, organic acids are used to adjust the pH of the solution to the desired value.

In many instances, it is also advantageous to add a suitable antioxidant to the solution such as ascorbic acid.

The following working example illustrates a preferred embodiment of the present invention as applied to the preservation of shell fish. A solution is prepared containing from 1 to 3 parts by weight of alginate in 100 parts by weight of water, and citric acid is added to the solution sufficient to adjust the pH to a value between 2.5 and 4. To this solution, a small amount of calcium tartrate is added. The amount of calcium tartrate is varied to give a gelling time of from 5 to 30 minutes, and a quantity of from 0.1 to 0.5 parts by weight is used. To the solution thus obtained, about 15% glycerin is added and a gel is obtained which is solid but not hard at a temperature of from 15° to 20° below zero C., and which can be cut or broken into pieces without thawing foodstuffs frozen therein.

Instead of using 15% glycerin, the same effect can be obtained by adding to the solution an amount of salt up to about 10% and preferably from about 2% to about 4%.

In use, articles may be dipped in the above solution and then frozen or, alternatively, articles can be placed in a package, the package filled with the solution, allowed to gel, and then quick frozen.

The invention is particularly advantageous in the preservation of fat fish such as herring, mackerel, salmon, and the like. The fat of such fish when deep frozen in accordance with the present invention will be preserved for long periods far beyond that obtainable by prior art methods. Even after nine months, the fat does not become rancid.

In addition to the components listed above, fillers can also be used advantageously in preparing the gel. Suitable fillers are well-known to those skilled in the art in the rubber and paper industries.

We claim:

1. In a method for the preservation of food stuffs by block freezing the steps comprising placing the unfrozen foodstuff in an aqueous fluid solution of an alginate and a calcium salt which will gelatinize within from five to thirty minutes whereby there is formed a solid block composed of said food stuff and the thus-formed gel, and subsequently deep freezing said solid block.

2. The method of claim 1 wherein the solution also contains up to 10% of ordinary salt.

3. The method of claim 1 wherein the solution also contains from about 5% to about 30% glycerine.

4. The method of claim 1 wherein the solution also contains an organic acid.

5. The method of claim 1 wherein the solution contains an antioxidant.

6. The method of claim 1 wherein the solution comprises about 100 parts water, about 1 to 3 parts alginate and about 0.1 to 0.5% calcium tartrate.

References Cited in the file of this patent

UNITED STATES PATENTS

| | | |
|---|---|---|
| 2,191,352 | Oprean | Feb. 20, 1940 |
| 2,329,472 | Koonz | Sept. 14, 1943 |
| 2,420,308 | Gates | May 13, 1947 |
| 2,441,729 | Steiner | May 18, 1948 |
| 2,517,595 | Owens | Aug. 8, 1950 |
| 2,536,708 | Angermeier | Jan. 2, 1951 |
| 2,611,708 | Owens | Sept. 23, 1952 |

FOREIGN PATENTS

| | | |
|---|---|---|
| 983,509 | France | June 25, 1951 |